United States Patent [19]

Miyagawa et al.

[11] Patent Number: 5,219,967
[45] Date of Patent: Jun. 15, 1993

[54] ACRYLIC COPOLYMER RUBBER

[75] Inventors: Yasumichi Miyagawa, Hikari; Mitsuhiro Kamezawa, Shinnanyo; Toshiya Higashino; Takashi Yamamoto, both of Tokuyama; Shinji Ozoe, Shinnanyo, all of Japan

[73] Assignee: Tosoh Corporation, Yamaguchi, Japan

[21] Appl. No.: 730,748

[22] Filed: Jul. 16, 1991

[30] Foreign Application Priority Data

Jul. 18, 1990 [JP] Japan .................................. 2-187878
Nov. 8, 1990 [JP] Japan .................................. 2-301101
May 27, 1991 [JP] Japan .................................. 3-149315

[51] Int. Cl.$^5$ .............................................. C08F 24/00
[52] U.S. Cl. ....................................... 526/273; 526/312; 526/318; 526/292.1
[58] Field of Search ............. 526/273, 318, 312, 292.1

[56] References Cited

U.S. PATENT DOCUMENTS 2,720,512 10/1955 Butler .................................. 526/312
4,625,005 11/1986 Miyabayashi et al. ............. 526/273
4,675,362  6/1987 Miyabayashi et al. ............. 525/208

*Primary Examiner*—Joseph L. Schofer
*Assistant Examiner*—Alex H. Walker
*Attorney, Agent, or Firm*—Sughrue, Mion, Zinn, Macpeak & Seas

[57] ABSTRACT

An acrylic copolymer rubber which is a random copolymer of
(A) a cyano group-containing acrylate or methacrylate of the following formula (I):

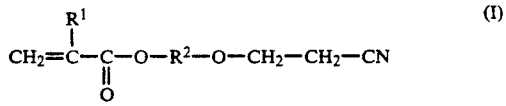

(I)

wherein $R^1$ is hydrogen or methyl, and $R^2$ is —$C_nH_{2n}$— or —$CH_2CH_2$—O—$CH_2CH_2$—, wherein n is an integer of from 2 to 4,
(B) at least one of ethyl acrylate and n-butyl acrylate, and
(C) at least one of glycidyl methacrylate and allyl glycidyl ether, or vinyl chloroacetate,
wherein the amounts of units derived from the above (A), (B) and (C) in said copolymer are from 5 to 70% by weight, from 20 to 94.5% by weight and from 0.5 to 10% by weight, respectively, and which has a Mooney viscosity $ML_{1+4}$ (100° C.) of at least 5.

5 Claims, No Drawings

ACRYLIC COPOLYMER RUBBER

The present invention relates to a novel copolymer rubber. More particularly, it relates to an acrylic copolymer which is excellent in heat resistance, fuel oil resistance and cold resistance.

As a rubber material having good resistance against fuel oil such as gasoline, nitrile rubber has been widely used. Recently, however, as the trend for high performance of automobiles advances in the automobile field, the environment in which rubber parts are used tends to be under high temperature conditions. Accordingly, a rubber material having excellent heat resistance and fuel oil resistance is desired. In this respect, nitrile rubber is poor in the heat resistance, and it is difficult to use nitrile rubber under such high temperature conditions.

Therefore, a rubber material having better heat resistance such as fluorine rubber, hydrin rubber or hydrogenated nitrile rubber is used instead of such nitrile rubber. However, fluorine rubber is very expensive and thus has a problem in cost although it is excellent in heat resistance and fuel oil resistance. Hydrin rubber and hydrogenated nitrile rubber are not yet fully satisfactory although their heat resistance is better than nitrile rubber.

On the other hand, acrylic rubber comprising an alkyl acrylate as the main component, has heat resistance superior to hydrogenated nitrile rubber, but it is very poor in resistance against fuel oil and can not be used as a part which is in contact with fuel oil.

Recently, an acrylic copolymer rubber containing a cyanoalkyl acrylate as one component has been disclosed as a rubber excellent in heat resistance and fuel oil resistance (Japanese Unexamined Patent Publications No. 203614/1985, No. 203615/1985 and 203616/1985). However, when the cyanoalkyl acrylate is one having a short alkyl group such as cyanomethyl acrylate or cyanoethyl acrylate, there is a problem that the glass transition temperature of the resulting polymer tends to be so high that the cold resistance will be poor. On the other hand, in the case of cyanobutyl acrylate having a long alkyl group, although the glass transition temperature of the resulting polymer is low, the synthesis of such a monomer is not easy, and the monomer is hardly available.

It is an object of the present invention to provide a novel acrylic copolymer rubber which is excellent in fuel oil resistance and cold resistance and which has heat resistance superior to hydrogenated nitrile rubber.

The present inventors have found it possible to obtain an acrylic copolymer rubber excellent in heat resistance and fuel oil resistance by using an acrylate or methacrylate containing a cyano group (hereinafter referred to as a cyano group-containing (meth)acrylate) which can readily be prepared from relatively inexpensive materials, as one component of the constituting monomers The present invention has been accomplished on the basis of this discovery.

The present invention provides an acrylic copolymer rubber which is a random copolymer of
(A) a cyano group-containing (meth)acrylate of the following formula (I):

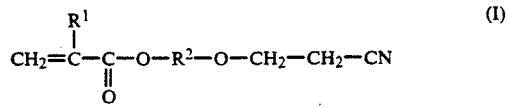

wherein $R_1$ is hydrogen or methyl, and $R^2$ is $-C_nH_{2n}-$ or $-CH_2CH_2-O-CH_2CH_2-$, wherein n is an integer of from 2 to 4,
(B) at least one of ethyl acrylate and n-butyl acrylate, and
(C) at least one of glycidyl methacrylate and allyl glycidyl ether, or vinyl chloroacetate,
wherein the amounts of units derived from the above (A), (B) and (C) in said copolymer are from 5 to 70% by weight, from 20 to 94.5% by weight and from 0.5 to 10% by weight, respectively, and which has a Mooney viscosity $ML_{1+4}$ (100° C.) of at least 5.

Now, the present invention will be described in detail with reference to the preferred embodiments.

The constituting unit (A) of the copolymer rubber of the present invention is a cyano group-containing (meth)acrylate of the formula (I). Specifically, it is an acrylate or methacrylate of 2-(2-cyanoethoxy)ethyl alcohol, 3-(2-cyanoethoxy)propyl alcohol, 4-(2-cyanoethoxy)butyl alcohol or 2-[2-(2-cyanoethoxy)ethoxy]ethyl alcohol. The amount of the cyano group-containing (meth)acrylate in the copolymer rubber of the present invention is usually from 5 to 70% by weight, preferably from 10 to 60% by weight. If the amount of the cyano group-containing (meth)acrylate is small, the fuel oil resistance tends to be poor, such being undesirable. On the other hand, although the fuel oil resistance increases as the amount of the cyano group-containing (meth)acrylate in the copolymer rubber increases, it is possible to obtain a copolymer rubber having adequate fuel oil resistance when the amount is at most 70% by weight, and it is not desirable to introduce more than 70% by weight of the cyano group-containing (meth)acrylate to the copolymer rubber, since the demerit from the viewpoint of the cost tends to be substantial.

The cyano group-containing (meth)acrylate can readily be prepared by the reaction of acrylic acid or methacrylic acid with a cyanoethoxy alcohol compound of the following formula (III):

wherein $R^3$ is $-C_nH_{2n}-$ or $-CH_2CH_2-O-CH_2CH_2-$ wherein n is an integer of from 2 to 4, which can be obtained by a cyano ethylation reaction of acrylonitrile with a diol compound of the following formula (II):

wherein $R^3$ is as defined in the formula (III).

The constituting unit (B) of the copolymer rubber of the present invention is at least one of ethyl acrylate and n-butyl acrylate, and its amount in the copolymer rubber of the present invention is usually from 10 to 94.5% by weight, preferably from 30 to 89.5% by weight. The constituting ratio of ethyl acrylate and n-butyl acrylate in the constituting unit (B) is not particularly limited. However, when the fuel oil resistance of the resulting copolymer rubber is important, it is preferred to have a high constituting ratio of ethyl acrylate, and when the cold resistance is important, it is preferred to have a high constituting ratio of n-butyl acrylate.

The constituting unit (C) of the copolymer rubber of the present invention is the unit serving as a crosslinking point at the time of the vulcanization of the copolymer rubber. Specifically, it is at least one of glycidyl methacrylate and allyl glycidyl ether, or vinyl chloroacetate. The amount of the constituting unit (C) in the copolymer rubber is usually from 0.5 to 10% by weight, preferably from 0.5 to 5% by weight. If the amount of the constituting unit (C) is small, the vulcanization can not be conducted adequately. On the other hand, if the amount is too much, the vulcanization proceeds too much to obtain a satisfactory vulcanizate. The acrylic copolymer rubber of the present invention can be prepared by copolymerizing a mixture of monomers for the above constituting units (A), (B) and (C) in the presence of a radical initiator such as an inorganic or organic peroxide, an azo compound or a redox initiator. As the polymerization method, a known method such as bulk polymerization, solution polymerization, suspension polymerization or emulsion polymerization may be employed. Emulsion polymerization is particularly preferred.

For example, the acrylic copolymer rubber of the present invention can be prepared by emulsion polymerization as follows. A mixture of monomers for the components of the acrylic copolymer rubber, or such a mixture having a transfer agent further added as the case requires, is emulsified by an aqueous solution of an emulsifier. As the transfer agent, an alkyl mercaptan such as n-dodecylmercaptan, tert-dodecylmercaptan or n-octylmercaptan, is usually employed. As the emulsifier, any surfactant selected from anionic, cationic and nonionic surfactants can be employed. However, a combined use of anionic and nonionic surfactants is particularly preferred. To this emulsion, an initiator is added to conduct polymerization to obtain an acrylic copolymer rubber latex. As the initiator, an inorganic or organic peroxide such as potassium persulfate, ammonium persulfate, tert-butylhydroperoxide or cumeme hydroperoxide, or a redox initiator using the above peroxide and a reducing agent in combination, may be employed. The polymerization is conducted usually at a temperature of from 0° to 80° C., preferably from 10° to 50° C. After completion of the polymerization, the obtained latex is put into an aqueous solution of an inorganic salt such as calcium chloride to precipitate the polymer, followed by washing with water and drying to obtain the desired acrylic copolymer.

The acrylic copolymer rubber of the present invention can be vulcanized in the same manner as a commonly known acrylic rubber. The vulcanization of the acrylic copolymer rubber of the present invention is conducted by using a vulcanizer selected depending upon the type of the constituting unit (C) of the copolymer rubber, if necessary, with an addition of a vulcanization accelerator, a reinforcing agent, a filler, a plasticizer, an age preventing agent or a stabilizer. For example, as a vulcanizer to be used in a case where the constituting unit (C) is vinyl chloroacetate, a polyamine, a polyamine salt, a combination of a metal soap with sulfur or with a sulfur-donative compound, an organic ammonium carboxylate, or a combination of trimercapto triazine and a dithiocarbamic acid salt, may be employed. As the vulcanizer to be used in a case where the constituting unit (C) is glycidyl methacrylate and/or allyl glycidyl ether, a polyamine, a polyamine salt, a dithiocarbamic acid salt, an organic ammonium carboxylate, a combination of metal soap with sulfur or a sulfur donating compound, a combination of a polycarboxy compound or a carboxylic anhydride with a quaternary ammonium salt or a quaternary phosphonium salt, a combination of an imidazole compound with an alkyl sulfate, or guanidine or a guanidine derivative with sulfur or a sulfur donative compound, may be mentioned.

By the vulcanization of the acrylic copolymer rubber of the present invention, it is possible to obtain a vulcanizate excellent in the fuel oil resistance, heat resistance and ozone resistance, which is useful for various applications in which fuel oil resistance and heat resistance are required, including parts for fuel oil system such as hoses or sealing materials for automobiles.

Now, the present invention will be described in further detail with reference to Examples. However, it should be understood that the present invention is by no means restricted to such specific Examples.

In the following description, "parts" means "parts by weight". Further, measurements of the polymer composition of the copolymer rubber, the physical properties of non-valcanized rubber and vulcanized rubber, the thermal aging resistance, the fuel oil resistance and the glass transition temperature were conducted in accordance with the following methods and conditions.

Polymer composition: determined from the results of measurement of the contents of nitrogen, chlorine and carbon in the polymer by an elemental analysis and the results of an epoxy equivalent test (JIS K-7236).

Mooney viscosity: Measured in accordance with JIS K6300.

Physical properties of vulcanized rubber: Measured in accordance with JIS K6301.

Thermal aging resistance: The vulcanized rubber was aged for three days in a gear oven at 150° C., whereupon the physical properties of the vulcanized rubber were measured for evaluation.

Fuel oil resistance: The vulcanized rubber was immersed in fuel oil C at 50° C. for three days, whereby the volume change was measured for evaluation.

Glass transition temperature: The non-vulcanized rubber was used as the test sample, and the glass transition temperature was measured by a referential scanning calorimeter (DSC) at a temperature raising rate of 10° C. per minute.

EXAMPLES 1 to 6 and COMPARATIVE EXAMPLES 1 and 2

1/5 of a mixture comprising the monomer composition as identified in Table 1 and a proper amount of n-dodecyl mercaptan was mixed with ⅕ of an aqueous emulsifier solution comprising 1 part of polyoxyethylene lauryl ether, 1 part of polyoxyethylene lauryl ester, 4 parts of sodium lauryl sulfate, 0.7 part of disodium hydrogen phosphate, 0.3 part of sodium dihydrogen phosphate and 200 parts of distilled water, followed by stirring to obtain an emulsion. This emulsion was adjusted to 15° C., and 0.005 part of sodium iron (II) ethylene diamine tetraacetate, 0.02 part of tetrasodium ethylenediamine tetraacetate, 0.02 part of rongalit and 0.02 part of sodium hydrosulfite were added, and then an aqueous solution containing 0.2% by weight of tert-butyl hydroperoxide was dropwise added at a rate of 1.5 parts per minute to initiate the polymerization.

Thereafter, the temperature was maintained at 15° C., and the remaining mixture of the monomers and n- dodecylmercaptan and the emulsion composed of the aqueous emulsifier solution were dropwise added in about three hours. After the dropwise addition of the emulsifier, the polymerization was continued for further one hour, and then 0.2 part of 2,2-methylenebis-(4-methyl-6-tertbutylphenol) was added to terminate the polymerization. The conversion of the monomers was from 96 to 99% as calculated from the solid content in the latex. The obtained copolymer latex was put into an aqueous calcium chloride solution at 85° C., and the copolymer was isolated, thoroughly washed with water and then dried to obtain the desired copolymer rubber. The composition of the obtained copolymer rubber is shown in Table 1.

The obtained copolymer rubber was blended to have a composition as identified in Table 2, and the blend was kneaded by rolls, followed by press vulcanization at 170° C. for 20 minutes to obtain a vulcanized rubber sheet. This was further subjected to post vulcanization in a gear oven at 150° C. for 4 hours, and then evaluation was conducted. Table 1 shows the results of evaluation of the physical properties of the non-vulcanized rubbers and the vulcanized rubbers of Examples 1 to 6 and Comparative Examples 1 and 2.

COMPARATIVE EXAMPLE 3

Using acrylic rubber AR-72LS (manufactured by Nippon Zeon K.K.), vulcanized rubber was prepared and the evaluation of the physical properties was conducted in the same manner as in Example 1. Table 1 shows the results of evaluation of the physical properties of the non-vulcanized rubber and the vulcanized rubber.

COMPARATIVE EXAMPLE 4

Zetpol 1020 (manufactured by Nippon Zeon K.K.) which is hydrogenated nitrile rubber, was blended to have a composition as identified in Table 5, and the blend was kneaded by rolls, followed by press vulcanization at 160° C. for 20 minutes to obtain a vulcanized rubber sheet. The evaluation of the physical properties of the vulcanized rubber was conducted. Table 3 shows the results of evaluation of the physical properties of the non-vulcanized rubber and the vulcanized rubber.

EXAMPLES 7 to 10 and COMPARATIVE EXAMPLE 5

Copolymer rubbers were prepared in the same manner as in Example 1 except that the monomer compositions as identified in Table 3 were employed. The compositions of the obtained copolymer rubbers are shown in Table 3.

The obtained copolymer rubbers were blended to have the compositions as identified in Table 4, and the blends were kneaded by rolls, followed by press vulcanization at 170° C. for 20 minutes to obtain vulcanized rubber sheets. They were further subjected to post vulcanization in a gear oven at 150° C. for 8 hours, and then evaluation was conducted. Table 3 shows the results of evaluation of the physical properties of the non-vulcanized rubbers and the vulcanized rubbers.

COMPARATIVE EXAMPLE 6

Using acrylic rubber AR-32 (manufactured by Nippon Zeon K.K.), vulcanized rubber was prepared and the evaluation of the physical properties was conducted in the same manner as in Example 7. Table 3 shows the results of evaluation of the physical properties of the non-vulcanized rubber and the vulcanized rubber.

EXAMPLES 11 to 15 and COMPARATIVE EXAMPLE 7

Copolymer rubbers were prepared in the same manner as in Example 1 except that monomer compositions as identified in Table 6 were employed. The compositions of the obtained copolymer rubbers are shown in Table 6.

From the obtained copolymer rubbers, vulcanized rubbers were prepared and the evaluation of the physical properties was conducted in the same manner as in Example 1. Table 6 shows the results of evaluation of the physical properties of the non-vulcanized rubbers and the vulcanized rubbers.

EXAMPLES 16 to 19

Copolymer rubbers were prepared in the same manner as in Example 7 except that monomer compositions as identified in Table 7 were employed. The compositions of the obtained copolymer rubbers are shown in Table 7.

From the obtained copolymer rubbers, vulcanized rubbers were prepared and evaluation of the physical properties was conducted in the same manner as in Example 7. Table 7 shows the results of evaluation of the physical properties of the non-vulcanized rubbers and the vulcanized rubbers.

EXAMPLES 20 to 26

Copolymer rubbers were prepared in the same manner as in Example 1 except that monomer compositions as identified in Table 8 were employed. The compositions of the obtained copolymer rubbers are shown in Table 6.

From the obtained copolymer rubbers, vulcanized rubbers were prepared and evaluation of the physical properties was conducted in the same manner as in Example 1. Table 6 shows the results of evaluation of the physical properties of the non-vulcanized rubbers and the vulcanized rubbers.

EXAMPLES 27 to 36

Copolymer rubbers were prepared in the same manner as in Example 7 except that monomer compositions as identified in Table 9 were employed. The compositions of the obtained copolymer rubbers are shown in Table 7.

From the obtained copolymer rubbers, vulcanized rubbers were prepared and evaluation of the physical properties were conducted in the same manner as in Example 7. Table 9 shows the results of evaluation of the physical properties of the non-vulcanized rubbers and the vulcanized rubbers.

From the foregoing results, it is evident that the present invention provides acrylic copolymer rubbers excellent in the fuel oil resistance, cold resistance and heat resistance.

TABLE 1

|  | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| Monomer composition (wt %) | | | | | | | | | | |
| 2-(2-Cyanoethoxy)ethyl acrylate | 15 | 25 | 35 | 49 | 25 | 49 | — | 5 | — | — |
| Ethyl acrylate | 83 | 73 | 63 | 49 | 58 | — | 98 | 93 | — | — |
| n-Butyl acrylate | — | — | — | — | 15 | 49 | — | — | — | — |
| Vinyl chloroacetate | 2 | 2 | 2 | 2 | 2 | 2 | 2 | 2 | — | — |
| Polymer composition (wt %) | | | | | | | | | | |
| 2-(2-Cyanoethoxy)ethyl acrylate | 15.1 | 23.6 | 34.5 | 48.3 | 25.2 | 49.0 | — | 5.2 | — | — |
| Ethyl acrylate | 83.8 | 75.1 | 64.4 | 50.5 | 58.9 | — | 98.7 | 93.6 | — | — |
| n-Butyl acrylate | — | — | — | — | 14.8 | 49.8 | — | — | — | — |
| Vinyl chloroacetate | 1.1 | 1.3 | 1.1 | 1.2 | 1.1 | 1.2 | 1.3 | 1.2 | — | — |
| Mooney viscosity $ML_{1+4}$ (100° C.) | 38 | 36 | 32 | 31 | 24 | 26 | 50 | 48 | 31 | 80 |
| Physical properties at room temperature | | | | | | | | | | |
| Hardness (JIS-A) | 72 | 72 | 71 | 71 | 64 | 62 | 63 | 66 | 57 | 79 |
| Tensile strength (kg/cm$^2$) | 144 | 136 | 144 | 139 | 144 | 135 | 145 | 143 | 125 | 201 |
| Breaking elongation (%) | 200 | 140 | 170 | 140 | 240 | 260 | 230 | 220 | 280 | 370 |
| 100% modulus (kg/cm$^2$) | 76 | 89 | 71 | 83 | 55 | 48 | 46 | 44 | 46 | 61 |
| Thermal aging resistance | | | | | | | | | | |
| Change in the hardness (points) | 0 | 0 | +1 | +1 | +3 | +5 | 0 | 0 | +4 | +7 |
| Change in the tensile strength (%) | −1 | −3 | −6 | −14 | 0 | +2 | +1 | +1 | +12 | +7 |
| Change in the breaking elongation (%) | −10 | −7 | −12 | −21 | −17 | −25 | −4 | −5 | −23 | −52 |
| Change in 100% modulus (%) | −8 | −7 | +6 | +13 | 0 | +17 | 0 | +1 | +9 | +137 |
| Fuel oil resistance Volume change (%) | +58 | +40 | +30 | +22 | +51 | +43 | +132 | +113 | +143 | +49 |
| Cold resistance Glass transition temperature (°C.) | −20.0 | −19.3 | −19.6 | −19.8 | −23.6 | −40.5 | −17.8 | −18.2 | −30.7 | −25.6 |

TABLE 2

| | |
|---|---|
| Acrylic copolymer rubber | 100 Parts by weight |
| Stearic acid | 1 |
| Carbon black MAF | 50 |
| Potassium stearate | 0.5 |
| Sodium stearate | 3 |
| Sulfur | 0.3 |

TABLE 3

|  | Example 7 | Example 8 | Example 9 | Example 10 | Comparative Example 5 | Comparative Example 6 |
|---|---|---|---|---|---|---|
| Monomer composition (wt %) | | | | | | |
| 2-(2-Cyanoethoxy)ethyl acrylate | 25 | 35 | 25 | 30 | — | — |
| Ethyl acrylate | 73.6 | 63.6 | 38.6 | 65 | 98.6 | — |
| n-Butyl acrylate | — | — | 35 | — | — | — |
| Glycidyl methacrylate | 1.4 | 1.4 | 1.4 | — | 1.4 | — |
| Allyl glycidyl ether | — | — | — | 5 | — | — |
| Polymer composition (wt %) | | | | | | |
| 2-(2-Cyanoethoxy)ethyl acrylate | 25.6 | 36.2 | 25.2 | 33.1 | — | — |
| Ethyl acrylate | 72.8 | 62.3 | 38.0 | 65.4 | 98.4 | — |
| n-Butyl acrylate | — | — | 35.1 | — | — | — |
| Glycidyl methacrylate | 1.6 | 1.5 | 1.7 | — | 1.6 | — |
| Allyl glycidyl ether | — | — | — | 1.5 | — | — |
| Mooney viscosity $ML_{1+4}$ (100° C.) | 38 | 33 | 22 | 35 | 52 | 33 |
| Physical properties at room temperature | | | | | | |
| Hardness (JIS-A) | 68 | 73 | 52 | 70 | 64 | 54 |
| Tensile strength (kg/cm$^2$) | 141 | 126 | 111 | 133 | 158 | 119 |
| Breaking elongation (%) | 210 | 160 | 340 | 190 | 280 | 380 |
| 100% modulus (kg/cm$^2$) | 57 | 73 | 24 | 64 | 41 | 24 |
| Thermal aging resistance | | | | | | |
| Change in the hardness (points) | +6 | +4 | +10 | +4 | +3 | +6 |
| Change in the tensile | 0 | +2 | +4 | +1 | +2 | ±0 |

TABLE 3-continued

|  | Example 7 | Example 8 | Example 9 | Example 10 | Comparative Example 5 | Comparative Example 6 |
|---|---|---|---|---|---|---|
| strength (%) |  |  |  |  |  |  |
| Change in the breaking elongation (%) | −20 | −19 | −30 | −21 | −15 | −29 |
| Change in 100% modulus (%) | +33 | +25 | +58 | +30 | +21 | +58 |
| Fuel oil resistance Volume change (%) | +43 | +31 | +59 | +36 | +105 | +134 |
| Cold resistance Glass transition temperature (°C.) | −16.9 | −17.0 | −29.8 | −17.1 | −17.9 | −29.8 |

TABLE 4

| Acrylic copolymer rubber | 100 Parts by weight |
|---|---|
| Stearic acid | 1 |
| Carbon black MAF | 50 |
| Ammonium benzoate | 1 |

TABLE 5

| Hydrogenated nitrile rubber[1] | 100 Parts by weight |
|---|---|
| Stearic acid | 1 |
| ZnO 1# | 5 |
| Carbon black MAF | 50 |
| Sulfur | 0.5 |
| Accelerator TT[2] | 2 |
| Accelerator M[3] | 0.5 |

[1] Zetpol 1020 (manufactured by Nippon Zeon K.K.)
[2] Tetraethylthiuram disulfide
[3] Mercaptobenzothiazole

TABLE 6

|  | Example 11 | Example 12 | Example 13 | Example 14 | Example 15 | Comparative Example 7 |
|---|---|---|---|---|---|---|
| Monomer composition (wt %) |  |  |  |  |  |  |
| 4-(2-Cyanoethoxy)butyl acrylate | 20 | 40 | 50 | 40 | 50 | 5 |
| Ethyl acrylate | 78 | 58 | 48 | 38 | — | 93 |
| n-Butyl acrylate | — | — | — | 20 | 48 | — |
| Vinyl chloroacetate | 2 | 2 | 2 | 2 | 2 | 2 |
| Polymer composition (wt %) |  |  |  |  |  |  |
| 4-(2-Cyanoethoxy)butyl acrylate | 19.5 | 38.8 | 51.2 | 39.5 | 50.5 | 4.9 |
| Ethyl acrylate | 79.4 | 60.0 | 47.7 | 39.8 | — | 93.8 |
| n-Butyl acrylate | — | — | — | 19.4 | 48.4 | — |
| Vinyl chloroacetate | 1.1 | 1.2 | 1.1 | 1.3 | 1.1 | 1.3 |
| Mooney viscosity $ML_{1+4}$ (100° C.) | 40 | 35 | 30 | 25 | 23 | 43 |
| Physical properties at room temperature |  |  |  |  |  |  |
| Hardness (JIS-A) | 62 | 59 | 63 | 60 | 55 | 62 |
| Tensile strength (kg/cm$^2$) | 169 | 160 | 158 | 135 | 130 | 157 |
| Breaking elongation (%) | 240 | 230 | 230 | 210 | 200 | 250 |
| 100% modulus (kg/cm$^2$) | 60 | 54 | 58 | 50 | 52 | 58 |
| Thermal aging resistance |  |  |  |  |  |  |
| Change in the hardness (points) | +1 | +2 | +2 | +4 | +6 | +1 |
| Change in the tensile strength (%) | +1 | −3 | −2 | +2 | +4 | +1 |
| Change in the breaking elongation (%) | −8 | −8 | −10 | −10 | −13 | −6 |
| Change in 100% modulus (%) | −7 | +20 | +17 | +15 | +20 | −3 |
| Fuel oil resistance Volume change (%) | +60 | +38 | +33 | +46 | +63 | +102 |
| Cold resistance Glass transition temperature (°C.) | −25.8 | −31.5 | −34.7 | −35.5 | −49.0 | −21.3 |

TABLE 7

|  | Example 16 | Example 17 | Example 18 | Example 19 |
|---|---|---|---|---|
| Monomer composition (wt %) |  |  |  |  |
| 4-(2-Cyanoethoxy)butyl acrylate | 20 | 40 | 40 | 40 |
| Ethyl acrylate | 79 | 59 | 39 | 55 |
| n-Butyl acrylate | — | — | 20 | — |
| Glycidyl methacrylate | 1 | 1 | 1 | — |
| Allyl glycidyl ether | — | — | — | 5 |
| Polymer composition (wt %) |  |  |  |  |
| 4-(2-Cyanoethoxy)butyl acrylate | 19.5 | 40.1 | 39.0 | 39.2 |
| Ethyl acrylate | 79.1 | 58.6 | 38.9 | 59.3 |
| n-Butyl acrylate | — | — | 20.8 | — |
| Glycidyl methacrylate | 1.4 | 1.3 | 1.3 | — |
| Allyl glycidyl ether | — | — | — | 1.5 |
| Mooney viscosity $ML_{1+4}$ (100° C.) | 34 | 25 | 23 | 22 |
| Physical properties at room temperature |  |  |  |  |
| Hardness (JIS-A) | 64 | 57 | 56 | 58 |

TABLE 7-continued

|  | Example 16 | Example 17 | Example 18 | Example 19 |
|---|---|---|---|---|
| Tensile strength (kg/cm²) | 125 | 113 | 112 | 120 |
| Breaking elongation (%) | 330 | 310 | 280 | 300 |
| 100% modulus (kg/cm²) | 35 | 28 | 26 | 30 |
| Thermal aging resistance |  |  |  |  |
| Change in the hardness (points) | +5 | +6 | +7 | +5 |
| Change in the tensile strength (%) | ±0 | −7 | −2 | −1 |
| Change in the breaking elongation (%) | −18 | −23 | −27 | −20 |
| Change in 100% modulus (%) | +38 | +43 | +45 | +40 |
| Fuel oil resistance |  |  |  |  |
| Volume change (%) | +62 | +38 | +48 | +40 |
| Cold resistance |  |  |  |  |
| Glass transition temperature (°C.) | −25.3 | −32.0 | −36.1 | −32.3 |

TABLE 8

|  | Example 20 | Example 21 | Example 22 | Example 23 | Example 24 | Example 25 | Example 26 |
|---|---|---|---|---|---|---|---|
| Monomer composition (wt %) |  |  |  |  |  |  |  |
| 3-(2-Cyanoethoxy)propyl acrylate | 30 | 40 | 40 | — | — | — | — |
| 2-[2-(2-Cyanoethoxy)ethoxy]ethyl acrylate | — | — | — | 40 | 40 | — | — |
| 4-(2-Cyanoethoxy)butyl methacrylate | — | — | — | — | — | 40 | 40 |
| Ethyl acrylate | 68 | 58 | 38 | 58 | 38 | 58 | 38 |
| n-Butyl acrylate | — | — | 20 | — | 20 | — | 20 |
| Vinyl chloroacetate | 2 | 2 | 2 | 2 | 2 | 2 | 2 |
| Polymer composition (wt %) |  |  |  |  |  |  |  |
| 3-(2-Cyanoethoxy)propyl acrylate | 29.2 | 38.5 | 39.1 | — | — | — | — |
| 2-[2-(2-Cyanoethoxy)ethoxy]ethyl acrylate | — | — | — | 38.0 | 38.4 | — | — |
| 4-(2-Cyanoethoxy)butyl methacrylate | — | — | — | — | — | 39.6 | 38.3 |
| Ethyl acrylate | 69.4 | 60.2 | 40.1 | 60.9 | 40.1 | 59.1 | 41.3 |
| n-Butyl acrylate | — | — | 19.5 | — | 20.3 | — | 19.2 |
| Vinyl chloroacetate | 1.4 | 1.3 | 1.3 | 1.1 | 1.2 | 1.3 | 1.2 |
| Mooney viscosity |  |  |  |  |  |  |  |
| $ML_{1+4}$ (100° C.) | 33 | 30 | 28 | 28 | 25 | 30 | 27 |
| Physical properties at room temperature |  |  |  |  |  |  |  |
| Hardness (JIS-A) | 64 | 66 | 65 | 67 | 64 | 70 | 67 |
| Tensile strength (kg/cm²) | 135 | 125 | 118 | 130 | 120 | 135 | 118 |
| Breaking elongation (%) | 240 | 200 | 190 | 210 | 220 | 220 | 210 |
| 100% modulus (kg/cm²) | 60 | 69 | 65 | 68 | 64 | 65 | 62 |
| Thermal aging resistance |  |  |  |  |  |  |  |
| Change in the hardness (points) | +2 | +3 | −4 | +3 | +5 | +4 | +4 |
| Change in the tensile strength (%) | +10 | +12 | +11 | +8 | +12 | +5 | +7 |
| Change in the breaking elongation (%) | −12 | −20 | −25 | −20 | −26 | −12 | −15 |
| Change in 100% modulus (%) | +8 | +11 | +15 | +10 | +45 | +13 | +15 |
| Fuel oil resistance |  |  |  |  |  |  |  |
| Volume change (%) | +43 | +35 | +46 | +35 | +14 | +45 | +56 |
| Cold resistance |  |  |  |  |  |  |  |
| Glass transition temperature (°C.) | −25.1 | −28.5 | −34.2 | −28.2 | −34.5 | −19.7 | −26.0 |

TABLE 9

|  | Example 27 | Example 28 | Example 29 | Example 30 | Example 31 | Example 32 | Example 33 | Example 34 | Example 35 | Example 36 |
|---|---|---|---|---|---|---|---|---|---|---|
| Monomer composition (wt %) |  |  |  |  |  |  |  |  |  |  |
| 3-(2-Cyanoethoxy)propyl acrylate | 30 | 40 | 40 | 40 | — | — | — | — | — | — |
| 2-[2-(2-Cyanoethoxy)ethoxy]ethyl acrylate | — | — | — | — | 40 | 40 | 40 | — | — | — |
| 4-(2-Cyanoethoxy)butyl methacrylate | — | — | — | — | — | — | — | 40 | 40 | 40 |
| Ethyl acrylate | 69 | 59 | 55 | 39 | 59 | 39 | 55 | 59 | 39 | 55 |
| n-Butyl acrylate | — | — | — | 20 | — | 20 | — | — | 20 | — |
| Glycidyl methacrylate | 1 | 1 | — | 1 | 1 | 1 | — | 1 | 1 | — |
| Allyl glycidyl ether | — | — | 5 | — | — | — | 5 | — | — | 5 |
| Polymer composition (wt %) |  |  |  |  |  |  |  |  |  |  |
| 3-(2-Cyanoethoxy)propyl acrylate | 29.8 | 38.7 | 40.2 | 38.7 | — | — | — | — | — | — |
| 2-[2-(2-Cyanoethoxy)ethoxy]ethyl acrylate | — | — | — | — | 38.6 | 38.0 | 41.5 | — | — | — |
| 4-(2-Cyanoethoxy)butyl methacrylate | — | — | — | — | — | — | — | 39.0 | 38.9 | 41.4 |
| Ethyl acrylate | 68.9 | 60.2 | 58.6 | 39.9 | 60.2 | 40.2 | 57.4 | 59.8 | 40.1 | 57.4 |
| n-Butyl acrylate | — | — | — | 20.2 | — | 20.5 | — | — | 19.7 | — |
| Glycidyl methacrylate | 1.3 | 1.1 | — | 1.2 | 1.2 | 1.3 | — | 1.2 | 1.3 | — |
| Allyl glycidyl ether | — | — | 1.2 | — | — | — | 1.1 | — | — | 1.2 |
| Mooney viscosity |  |  |  |  |  |  |  |  |  |  |
| $ML_{1+4}$ (100° C.) | 33 | 30 | 24 | 29 | 33 | 30 | 25 | 35 | 31 | 27 |
| Physical properties at room temperature |  |  |  |  |  |  |  |  |  |  |
| Hardness (JIS-A) | 60 | 63 | 62 | 63 | 65 | 63 | 63 | 64 | 63 | 62 |

TABLE 9-continued

|  | Example 27 | Example 28 | Example 29 | Example 30 | Example 31 | Example 32 | Example 33 | Example 34 | Example 35 | Example 36 |
|---|---|---|---|---|---|---|---|---|---|---|
| Tensile strength (kg/cm$^2$) | 128 | 118 | 120 | 115 | 120 | 115 | 122 | 123 | 120 | 118 |
| Breaking elongation (%) | 280 | 240 | 210 | 230 | 230 | 220 | 250 | 250 | 240 | 240 |
| 100% modulus (kg/cm$^2$) | 45 | 41 | 45 | 43 | 50 | 47 | 41 | 45 | 41 | 40 |
| Thermal aging resistance |  |  |  |  |  |  |  |  |  |  |
| Change in the hardness (points) | +2 | +4 | +5 | +4 | +1 | +2 | +1 | +5 | +6 | +5 |
| Change in the tensile strength (%) | +8 | +1 | +5 | +8 | −4 | −5 | +2 | +10 | +8 | +9 |
| Change in the breaking elongation (%) | −10 | −15 | −20 | −17 | −17 | −20 | −15 | −19 | −22 | −18 |
| Change in 100% modulus (%) | +20 | +28 | +30 | +25 | +25 | +27 | +22 | +38 | +37 | +33 |
| Fuel oil resistance |  |  |  |  |  |  |  |  |  |  |
| Volume change (%) | +45 | +35 | +37 | +47 | +36 | +44 | +38 | +48 | +60 | +50 |
| Cold resistance |  |  |  |  |  |  |  |  |  |  |
| Glass transition temperature (°C.) | −24.7 | −27.8 | −28.1 | −34.7 | −27.9 | −34.1 | −28.5 | −20.1 | −25.8 | −20.5 |

We claim:

1. An acrylic copolymer rubber which is a random copolymer of (A) a cyano group-containing acrylate or methacrylate of the following formula (I):

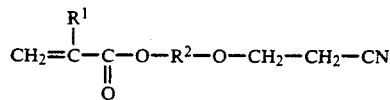

wherein R$^1$ is hydrogen or methyl, and R$^2$ is —C$_n$H$_{2n}$— or —CH$_2$CH$_2$—O—CH$_2$CH$_2$—, wherein n is an integer of from 2 to 4, (B) at least one of ethyl acrylate and n-butyl acrylate, and (C) at least one of glycidyl methacrylate and allyl glycidyl ether, or vinyl chloroacetate, wherein the amounts of units derived from the above (A), (B) and (C) in said copolymer are from 10 to 70% by weight, from 20 to 94.5% by weight and from 0.5 to 10% by weight, respectively, and which has a Mooney viscosity ML$_{1+4}$(100° C.) of at least 5.

2. The acrylic copolymer rubber according to claim 1, wherein the cyano group-containing acrylate or methacrylate of the formula (I) is an acrylate or methacrylate of 2-(2-cyanoethoxy)ethyl alcohol, 3-(2-cyanoethoxy)propyl alcohol, 4-(2-cyanoethoxy)butyl alcohol or 2-[2-(2-cyanoethoxy)ethoxy]ethyl alcohol.

3. The acrylic copolymer rubber according to claim 1, wherein the amount of units derived from A is from 10 to 60% by weight.

4. The acrylic copolymer rubber according to claim 1, wherein the amount of units derived from B is from 30 to 89.5% by weight.

5. The acrylic copolymer rubber according to claim 1, wherein the amount of units derived from C is from 0.5 to 5% by weight.

* * * * *